United States Patent [19]

Nosaka et al.

[11] 4,432,633
[45] Feb. 21, 1984

[54] ELECTROPHOTOGRAPHIC REPRODUCING APPARATUS

[75] Inventors: Isao Nosaka; Hirofumi Sakaguchi; Takao Shiozawa; Yozo Fujii, all of Tokyo, Japan

[73] Assignee: Konishiroku Photo Industry Co., Ltd., Tokyo, Japan

[21] Appl. No.: 343,706

[22] Filed: Jan. 28, 1982

[30] Foreign Application Priority Data

Feb. 13, 1981 [JP] Japan ................................. 56-19023

[51] Int. Cl.³ ........................................... G03G 15/28
[52] U.S. Cl. ..................................... 355/8; 355/3 R; 355/11
[58] Field of Search ....................... 355/3 R, 8, 11, 66, 355/3 DR, 133

[56] References Cited

U.S. PATENT DOCUMENTS

| | | | |
|---|---|---|---|
| 3,985,436 | 10/1976 | Tanaka et al. | 355/8 |
| 4,030,823 | 6/1977 | Brugger et al. | 355/8 |
| 4,180,319 | 12/1979 | Kaufmann et al. | 355/3 R |

Primary Examiner—Richard L. Moses
Attorney, Agent, or Firm—James E. Nilles

[57] ABSTRACT

An electrophotographic reproducing apparatus in which a reproducing apparatus body unit including an electrostatic latent image receptor such as a photosensitive member and other electrophotographic treating device is assembled in advance whereas an optical scanning unit including at least a document illumination lamp, a group of mirrors and a group of focusing lenses is assembled in advance in a predetermined positional relationship to the reproducing apparatus body unit, and both the units thus assembled are jointed at predetermined reference planes to each other and so integrated that they can be driven cooperatively with each other. Said two units further include jointing device at their respective predetermined reference planes.

11 Claims, 3 Drawing Figures

ELECTROPHOTOGRAPHIC REPRODUCING APPARATUS

BACKGROUND OF THE INVENTION

1. Field of the Invention

The present invention relates to an electrophotographic reproducing apparatus in which an optical scanning unit assembled in advance and a reproducing apparatus body unit including an electrostatic latent image receptor such as a photosensitive member and assembled in advance independently of the optical scanning unit are jointed into a unitary structure.

2. Description of the Prior Art

The electrophotographic reproducing apparatus is classified in accordance with an exposure system for exposing a document to be reproduced, into the type, in which a document glass plate is moved, and the type in which an optical scanning system is moved. According to the prior art, in case the electrophotographic reproducing apparatus of the optical scanning system moving type is to be assembled, the reproducing apparatus body is first framed. To this frame, there are consecutively attached stationary systems such as a photosensitive drum, a developing device and fixing device. On the reproducing apparatus body thus assembled, there is reciprocally movably placed an optical scanning unit which includes a document illumination lamp, lenses, mirrors and so on. Since the driving power of the optical scanning unit is usually supplied from the drive source for the photosensitive drum and a paper feed mechanism, a power transmission wire is made to run in operational relationship with the stationary systems after the optical scanning unit has been arranged. In this meanwhile the spacings between the mirrors and the lenses and between the mirrors are so adjusted that the light reflected from the document may be focused upon the photosensitive drum, and the lens positions are adjusted while taking the magnification or contraction of the image into consideration. The assembling and adjusting procedures thus far described invite many troubles and take much time. As a matter of fact, the adjusting procedures of the optical scanning unit accounts for a large percentage of the assembling procedures.

In order to reduce the number of the assembling steps to some extend, therefore, there has been conceived a method by which an optical scanning unit having its mirror running mechanism and its parallelism adjusted in advance is assembled with the reproducing apparatus body having its stationary systems assembled. According to this method, nevertheless, it is still necessary to make the driving wire run on the stationary systems after the assembly, to determine the spacings between the mirrors while observing the focused level of the image, and to determine the positions of the lenses while inspecting the magnifications. Thus, the adjusting work taking the most time is little lightened.

SUMMARY OF THE INVENTION

In view of the foregoing description, therefore, it is an object of the present invention to simplify the assembling procedures of a reproducing apparatus, especially, the procedures of adjusting the relationships between an optical scanning unit and the stationary systems of the reproducing apparatus body.

According to a feature of the present invention, a reproducing apparatus body unit including an electrostatic latent image receptor such as a photosensitive member and other electrophotographic treating means is assembled in advance whereas an optical scanning unit including at least a document illumination lamp, a group of mirrors and a group of focusing lenses is assembled in advance in a predetermined positional relationship to the reproducing apparatus body unit, and both the units thus assembled are jointed at predetermined reference planes to each other and so integrated that they can be driven cooperatively with each other.

Other objects and features of the present invention will be made apparent from the following description taken in conjunction with the accompanying drawings.

DESCRIPTION OF THE PREFERRED EMBODIMENTS

Figure 1:
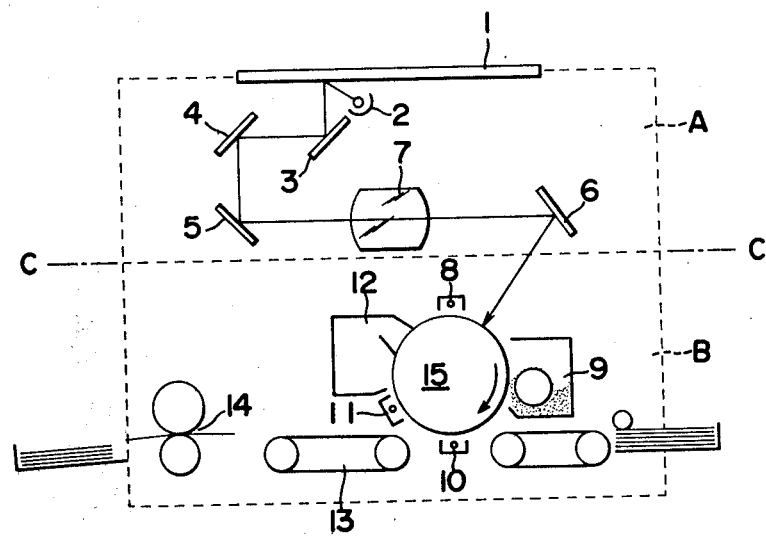
FIG. 1 is a schematic diagram showing the construction of an electrophotographic reproducing apparatus assembled in accordance with the present invention.
Figure 2:
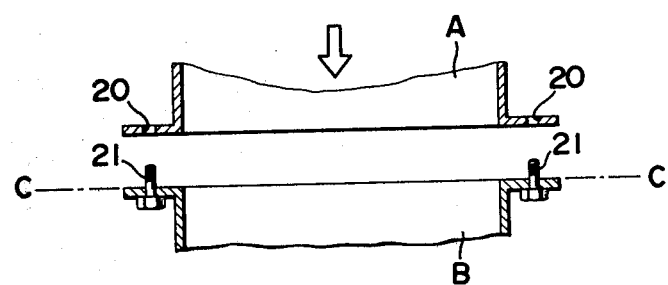
FIG. 2 is a view for explaining the unit jointing method according to the present invention.

FIG. 1 is a schematic diagram showing the basic construction of the electrophotographic reproducing apparatus according to the present invention. This electrophotographic reproducing apparatus of the present invention is constructed by jointing an image forming optical scanning unit A and a reproducing apparatus body unit B along a reference line C—C. The optical scanning unit A comprises a document glass plate 1, and an illumination lamp 2, first, second, third and fourth mirrors 3, 4, 5 and 6, and a focusing lens 7, all of which are used to illuminate a document placed on the document glass plate 1. The reproducing apparatus body unit B comprises a photosensitive drum 15, and a charge generator 8, a developing device 9, a transferring device 10, a charge eliminating device 11, a cleaning device 12, a conveyor device 13 and a fixing device 14, all of which are arranged around the photosensitive drum 15. Both the units A and B are jointed along the reference line C—C to each other, as shown in FIG. 2. Specifically, the plane of the unit A to be jointed is formed with reference hole 20, 20 at its four corners, and the plane of the unit B to be jointed is studded with reference pin 21, 21 at its four corners so that the two units A and B are jointed into a unitary structure by inserting the reference pin 21, 21 into the reference hole 20, 20.

Figure 3:
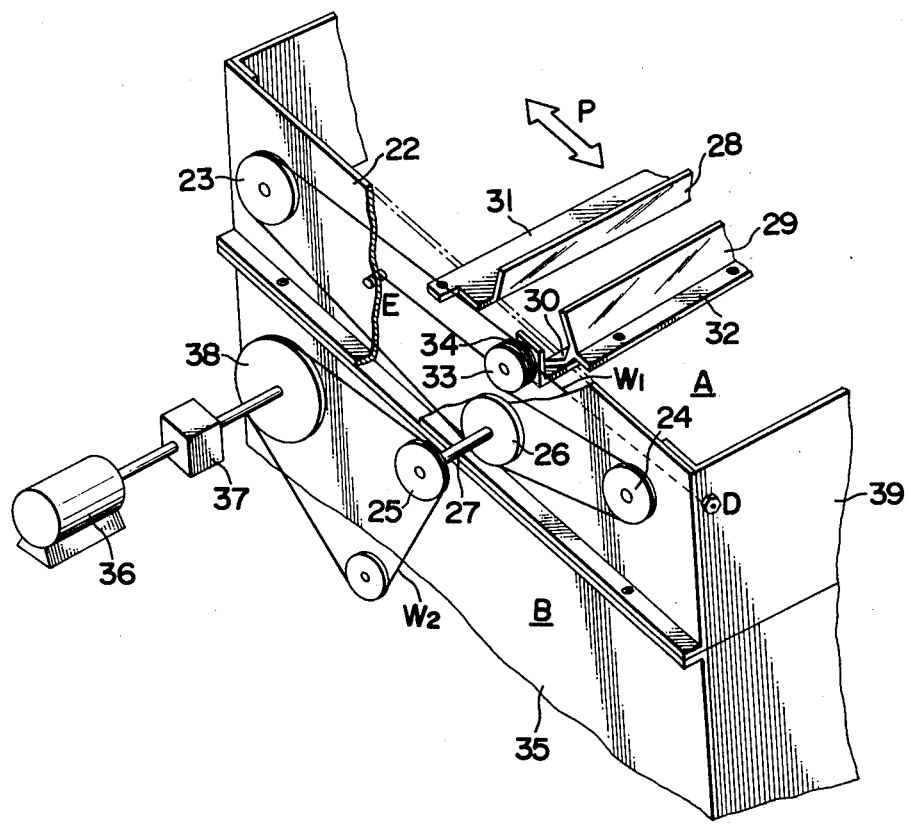
FIG. 3 is a perspective view showing the driving system of the electrophotographic reproducing apparatus assembled in accordance with the present invention.

In the present invention, it is necessary that the optical scanning unit A and the reproducing apparatus body unit B be assembled independently of each other before they are jointed. Therefore, this necessity will be described with reference to FIG. 3. The unit A is assembled on an original jig supposing the unit B. More specifically, stationary pulleys 23 and 24 are attached to a side plate 22 of the optical scanning unit A in the vicinity of both ends thereof, and a mirror driving input pulley 25 and a mirror driving pulley 26 are fixed to the same side plate 22 in the vicinity of the center thereof by means of a shaft 27. This shift 27 is attached to the housing embracing a not-shown bearing. First, second and third mirrors 28, 29 and 30 are held on mirror holders 31 and 32, respectively, which are mounted on an upper portion of the side plate 22. Movable pulleys 33 and 34 are rotatably attached to the end face of the mirror holder 32 by means of a common shaft. The respective mirrors are so held by not-shown but well-known means that they can move reciprocally in the directions of arrow P. The illumination lamp is omitted from FIG. 3. Next, the wire $W_1$, which has its one end fixed to a point D at an end plate 39 of the optical scanning unit A, is stretched from the movable pulley 33 consecutively through the stationary pulley 24, the driving pulley 26 (on which it is wound several times) and the stationary pulley 23 to run on the movable pulley 34 until its other end is fixed to a point E at the side plate 22.

On the other hand, the reproducing apparatus body unit B is constructed by attaching attaching members such as a side plate 35 and a bottom plate to a reference frame and by attaching in position both a driving unit such as a main motor 36, a two-way clutch mechanism 37 or a power supply pulley 38 and an electrophotographic treating device such as the photosensitive drum, the developing device or the fixing device to those attaching members.

Next, the optical scanning unit A and the reproducing body unit B thus assembled independently of each other are jointed along the reference line C—C to each other, as has been described hereinbefore, and the driving system of those two units is then constructed in the following manners. Specifically, the power transmission between the units A and B can be effected merely by making a wire $W_2$ run on the driving input pulley 25 of the unit A and the power supply pulley 38 of the unit B.

As has been described hereinbefore, the present invention is constructed merely by independently assembling both the optical scanning unit, which includes the illumination lamp, the lenses and the mirrors, and the reproducing apparatus body unit which includes the photosensitive drum and the other process units, by jointing both the units at the predetermined reference planes into the unitary structure after they have had their parts respectively adjusted, and by stretching the wires over the driving system between the two units. As a result, the reproducing apparatus can be completed without being required for many troubles and much time for the adjustment of the optical scanning system, i.e., at a reduced number of adjusting steps, thus remarkably contributing to the mass-production. According to the present invention, therefore, the optical scanning unit and the reproducing apparatus body unit have their respective adjustments made sufficiently in advance, and the joint between the two units is performed in a predetermined positional relationship. As a result, it is quite natural that the performance of the reproducing apparatus such as the magnification of the image or the clearness can be ensured without fail.

What is claimed is:

1. In electrophotographic reproducing apparatus:
   a pre-assembled optical scanning unit having first components including a movable optical device for reflecting a light beam from a document and means to move said device, said first components having predetermined positions relative to a first plane in said scanning unit;
   a pre-assembled reproducing apparatus body unit having second components including a movable electrostatic latent image receptor for receiving said light beam and means to move said receptor, said second components having predetermined positions relative to a second plane in said body unit;
   means to mechanically connect both pre-assembled units together so that the first and second planes assume a predetermined positional relationship whereby said light beam forms an undistorted and clear image on said receptor;
   and mechanical power transmission means comprising a drivable power supply shaft rotatably mounted on said body unit and drive means connected between said power supply shaft and the said moving means on both of the units.

2. Apparatus according to claim 1 wherein said means to mechanically connect both pre-assembled units together comprises projecting means on one unit which engage recess means on the other unit.

3. Apparatus according to claim 1 wherein said means to move said optical device in said scanning unit comprises an input pulley, wherein said means to move said receptor in said body unit comprises a driving pulley, and wherein said power transmission means comprises a power supply pulley driven by said power supply shaft and said drive means comprises an endless wire reeved around the three last-recited pulleys.

4. Apparatus according to claim 3 wherein said means to move said optical device in said scanning unit further comprises a driving pulley connected to said input pulley and a wire connected between said driving pulley and said optical device.

5. Apparatus according to claim 4 wherein said first components of said scanning unit further comprise a document illumination lamp, additional mirrors, and at least one lens.

6. Apparatus according to claim 4 or 5 wherein said second components of said body unit further comprise a charge generator, developing means, transfer means, charge eliminating means, cleaning means and conveyor means.

7. In electrophotographic reproducing apparatus:
   a pre-assembled optical scanning unit having first components including optical devices comprising at least one movable mirror for providing a reflected light beam from a document being scanned, a mirror driving pulley, a first wire connected between said mirror driving pulley and said one mirror to effect movement of the latter, and an input pulley connected to drive said mirror driving pulley, said first components having predetermined positions relative to a first plane;
   a pre-assembled reproducing apparatus body unit having second components including a movable electrostatic image receptor for receiving said reflected light beam, and a driving pulley to drive said receptor, said second components having predetermined positions relative to a second plane;
   means to mechanically connect both units together so that the first and second reference planes assume a predetermined positional relationship whereby said reflected light beam forms an undistorted and clear image on said receptor;
   and mechanical power transmission means comprising a drivable power supply pulley rotatably mounted on said body unit and a second endless wire reeved around said power supply pulley, said input pulley and said driving pulley.

8. Apparatus according to claim 7 wherein said one movable mirror is mounted on a mirror holder for reciprocating movement along a path, wherein first and second pulleys (33, 34) are rotatably mounted on said mirror holder, wherein a pair of spaced apart rotatable end pulleys (23, 24) are stationarily positioned near opposite ends of said path, and wherein said first wire has one end fixedly secured near one end of said path, is reeved around said first pulley, around one end pulley, around said mirror driving pulley, around the other end pulley, around said second pulley, and has its other end fixedly secured near the other end of said path.

9. Apparatus according to claim 7 or 8 wherein said means to mechanically connect both pre-assembled units together comprises projecting means on one unit which engage recess means on the other unit.

10. Apparatus according to claim 8 wherein said first components of said scanning unit further comprise a document illumination lamp, additional mirrors, and at least one lens.

11. Apparatus according to claim 8 or 10 wherein said second components of said body unit further comprise a charge generator, developing means, transfer means, charge eliminating means, cleaning means and conveyor means.

* * * * *